United States Patent
Farnham et al.

(10) Patent No.: US 7,807,755 B2
(45) Date of Patent: Oct. 5, 2010

(54) METHOD FOR REMOVING SULFUR-CONTAINING END GROUPS

(75) Inventors: William Brown Farnham, Hockessin, DE (US); Graeme Moad, Sassafras (AU); San Hoa Thang, Hawthorn East (AU); Ezio Rizzardo, Wheelers Hill (AU); Michael Fryd, Philadelphia, PA (US)

(73) Assignee: Commonwealth Scientific and Industrial Research Organisation, Campbell, ACT (AU)

( * ) Notice: Subject to any disclaimer, the term of this patent is extended or adjusted under 35 U.S.C. 154(b) by 459 days.

(21) Appl. No.: 11/578,226

(22) PCT Filed: May 11, 2005

(86) PCT No.: PCT/US2005/016583

§ 371 (c)(1),
(2), (4) Date: Oct. 11, 2006

(87) PCT Pub. No.: WO2005/113612

PCT Pub. Date: Dec. 1, 2005

(65) Prior Publication Data

US 2007/0225447 A1    Sep. 27, 2007

Related U.S. Application Data

(60) Provisional application No. 60/570,151, filed on May 12, 2004.

(51) Int. Cl.
C08F 8/00    (2006.01)
C08F 8/04    (2006.01)

(52) U.S. Cl. .................. 525/340; 525/330.3; 525/333.3; 525/374; 525/378; 525/387

(58) Field of Classification Search .............. 525/330.3, 525/333.3, 340, 374, 378, 387
See application file for complete search history.

(56) References Cited

FOREIGN PATENT DOCUMENTS

WO    WO 02/090397    * 11/2002

\* cited by examiner

*Primary Examiner*—Roberto Rábago
(74) *Attorney, Agent, or Firm*—Arent Fox LLP

(57) ABSTRACT

This invention provides a method for removing certain sulfur-containing groups from polymers, especially those made via RAFT polymerization processes.

10 Claims, No Drawings

METHOD FOR REMOVING SULFUR-CONTAINING END GROUPS

This application claims the benefit of application 60/570,151, filed May 12, 2004.

FIELD OF THE INVENTION

This invention provides a method for removing certain sulfur-containing groups from polymers, especially those made via RAFT polymerization processes.

BACKGROUND

There is increasing interest in developing polymerization processes that can be predictably controlled to produce polymers having specifically desired structures. One of the means for achieving such results is through a process of living polymerization. Such a process provides a higher degree of control during the synthesis of polymers having predictably well-defined structures and properties as compared to polymers made by conventional polymerization processes.

Controlled radical polymerization processes such as RAFT (reversible addition fragmentation chain transfer) provide useful embodiments of living polymerization processes. RAFT processes using xanthate or dithiocarbamate chain transfer RAFT agents are disclosed in WO 99/31144. RAFT processes using dithioester or trithiocarbonate chain transfer agents are disclosed in WO 98/01478, WO 200500319, WO 2005000924 and WO 2005000923.

The polymers produced by RAFT processes have end groups derived from the chain transfer agents used in these processes. For RAFT-derived polymers using xanthate, dithiocarbamate, dithioester or trithiocarbonate chain transfer agents, each polymer chain will contain at least one end group comprising a xanthate, dithiocarbamate, dithioester or trithiocarbonate functional group. In some end-use applications of the RAFT-derived polymers, it may be desirable to remove these functional groups and replace them with hydrogen.

WO 02/090397 discloses a process for substituting a dithiocarbonylated or dithiophosphorylated function on the chain end of a living organic polymer with a hydrogen atom by contacting the polymer with a source of free radicals and an organic compound bearing a labile hydrogen atom.

WO2005000923, WO2005003192, U.S. patent application Ser. No. 10/407,405, now U.S. Pat. No. 7,012,119 and U.S. patent application Ser. No. 10/609,225 now U.S. Pat. No. 6,988,439 disclose several methods for removing the sulfur-containing portion of a RAFT chain transfer agent from the polymer terminal end.

There remains a need for a RAFT end-group removal process that can be carried out on the RAFT polymer without first changing solvents or isolating the polymer product. There is also a need for a RAFT end-group removal process that allows for easy isolation of the end-group free polymer.

SUMMARY OF THE INVENTION

This invention provides a process for replacing a functional group, —SC(S)X, with —H, comprising contacting a polymer containing a functional group, —SC(S)X with a salt of hypophosphorous acid and a radical initiator, wherein X is R, $OR^1$, $N(R^2)_2$, $SR^3$, or $P(O)(OR^4)_2$;

R is substituted or unsubstituted $C_1$-$C_{25}$ alkyl; substituted or unsubstituted $C_2$-$C_{25}$ alkenyl; substituted or unsubstituted $C_2$-$C_{25}$ alkynyl; substituted or unsubstituted phenyl; substituted or unsubstituted naphthyl; and substituted or unsubstituted benzyl; and $R^1$, $R^2$, $R^3$, and $R^4$ are substituted or unsubstituted $C_1$-$C_{25}$ alkyl; substituted or unsubstituted $C_6$-$C_{10}$ aryl; a 3- to 8-membered carbocyclic or heterocyclic ring, or $N(R^2)_2$ is a 3- to 8-membered heterocyclic ring.

DETAILED DESCRIPTION

Definition of Terms

By "radical initiator" is meant a substance that can produce radical species under mild conditions and promote radical reactions. Typical examples include peroxides, azo compounds and halogens.

By "nitrogen base" is meant a basic compound that contains nitrogen.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Many of the chain transfer agents used in RAFT polymerization processes leave at least one sulfur-containing end-group on the RAFT-derived polymer. Typically, the sulfur-containing end-group has the structure —SC(S)X, where X is an alkyl, aryl, alkoxy, amine or alkylthio group. In some end-use applications of the RAFT polymer, the sulfur-containing end-group can be left in place. In other end-use applications, it is desirable to remove the sulfur-derived end-group and replace it with a hydrogen atom. Similarly, it may be desirable to remove sulfur-containing groups that are in the polymer backbone, as might be produced from a RAFT process using a symmetrical trithiocarbonate.

This invention provides a simple process for replacing a functional group, —SC(S)X, with —H, comprising contacting a polymer containing a functional group, —SC(S)X, with a salt of hypophosphorous acid and a radical initiator, wherein X is R, OR$^1$, N(R$^2$)$_2$, SR$^3$, or P(O)(OR$^4$)$_2$;

R is substituted or unsubstituted C$_1$-C$_{25}$ alkyl; substituted or unsubstituted C$_2$-C$_{25}$ alkenyl; substituted or unsubstituted C$_2$-C$_{25}$ alkynyl; substituted or unsubstituted phenyl; substituted or unsubstituted naphthyl; and substituted or unsubstituted benzyl; and R$^1$, R$^2$, R$^3$, and R$^4$ are substituted or unsubstituted C$_1$-C$_{25}$ alkyl; substituted or unsubstituted C$_6$-C$_{10}$ aryl; a 3- to 8-membered carbocyclic or heterocyclic ring, or N(R$^2$)$_2$ is a 3- to 8-membered heterocyclic ring.

Suitable substituents include alkyl, aryl, ether, Cl, Br, F and silyl substitutents.

Suitable salts of hypophosphorous acid include salts in which the cation is a protonated nitrogen base or tetra-alkyl ammonium.

The process of this invention cleanly removes the sulfur-containing group, and can be carried out without first isolating the RAFT polymer. In many instances, it can be carried out in the same solvent in which the RAFT polymerization process was conducted. The use of a nitrogen-base salt of hypophosphorous acid can also simplify the purification of the end group-free polymer since, in many cases, the polymer will be less soluble than the salt in polar solvents.

In the process of this invention, the polymer containing a functional group, —SC(S)X, can be the product of a RAFT polymerization process, as described, for example, in WO 98/01478, WO99/31144, WO01/77198, WO 200500319, WO 2005000924 or WO 2005000923.

The functional group, —SC(S)X, can also originate as a functional group on one or more of the (co)monomers used to prepare the polymer.

In one embodiment of this invention the salt of hypophosphorous acid is formed by reaction of hypophosphorous acid, H$_3$PO$_2$, with a nitrogen base. The nitrogen base is selected from the group of primary, secondary, or tertiary nitrogen bases, and ammonium salts. Suitable tertiary nitrogen bases include, but are not limited to, trialkylamines, Dabco (1,4-diazabicyclo[2.2.2]octane), DBU (1,8-diazabicyclo[5.4.0]undec-7-ene), N-alkylpiperidines, morpholine and its derivatives, and tertiary amines substituted with aromatic groups. The alkyl and aromatic groups can be substituted with heteroatoms such as oxygen. It is important that primary and secondary amines are fully quaternized since excess reagent may give by-products.

In another embodiment of this invention the salt of hypophosphorous acid is a tetraalkylammonium salt. Suitable ammonium salts include tetra-alkylammonium, R'$_4$N$^+$, and alkyl-substituted guanidinium hypophosphite salts, where R' is C$_1$-C$_{18}$ alkyl. Examples of R'$_4$N$^+$ H$_2$PO$_2^-$ are disclosed by J. Cabral, et al., J. Am. Chem. Soc. 1986, 108, 4672.

Hypophosphorous acid, which is usually provided as a 50% aqueous solution, can be mixed with the nitrogen base in an organic solvent (e.g., toluene), and the water removed under reduced pressure to form a salt. The salts can then be used in an aqueous or a non-aqueous process for removing the —SC(S)X functional group(s) from the polymer. Alternatively, hypophosphorous acid and the nitrogen base can be added to the reaction mixture separately to form the salt in situ. Non-aqueous systems may be preferred if the reagents are only sparingly soluble in water. A general procedure for preparing salts of hypophosphorous acid and a tertiary nitrogen base is disclosed by D. H. R. Barton, et al., Tetrahedron Letters 1992, 33, 5709.

The process is not limited by pressure constraints and can be carried out at, below, and above atmospheric pressure. There is no particular advantage in operating pressure vessels except to contain low-boiling or supercritical media. The reacting components (substrate, hypophosphite salt and radical source) must exhibit at least partial solubility during the reaction stage. Dissolution kinetics must be consonant with the lifetime of the radical generator at the temperature employed. Thus, the reaction medium can be an organic liquid, water, or a supercritical fluid such as CO$_2$. Product isolation and purification methods are determined by the requirements of product use. For some applications, it is preferable that end-group and reagent residues and co-products be nearly completely removed. Preferred hypophosphite salts of this invention allow for practical purification using conventional, two-phase partitioning techniques, including adsorption, e.g., on an ion-exchange column. Useful reaction temperatures are governed by radical initiator and carbon-sulfur bond cleavage kinetics: suitable temperatures are from about 25° C. to about 150° C., with a preferred range of 50-120° C.

EXAMPLES

The following examples illustrate certain features and advantages of the present invention. They are intended to be illustrative of the invention, but not limiting. All percentages are by weight, unless otherwise indicated.

Definition of Chemicals and Monomers used (Commercial Source)

PGMEA=propylene glycol methyl ether acetate (Sigma-Aldrich Chemical Co., Milwaukee, Wis.)

MAMA=methyl adamantyl methacrylate (Idemitsu Japan, Tokyo, Japan)

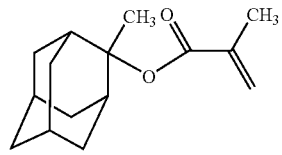

α-GBLMA=alpha-methacryloxy-gamma-butyrolactone (ENF Chemical, Seoul, South Korea)

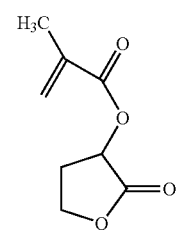

β-GBLMA=beta-methacryloxy-gamma-butyrolactone (ENF Chemical, Seoul, South Korea)

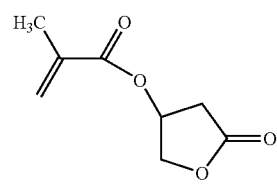

PinMAc=2-methyl-2-propenoic acid, 2-hydroxy-1,1,2-trimethylpropyl ester [CAS Reg number 97325-36-5]

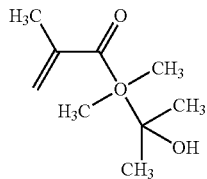

HAdMA=3-hydroxy-1-adamantyl methacrylate (Idemitsu Japan, Tokyo, Japan)

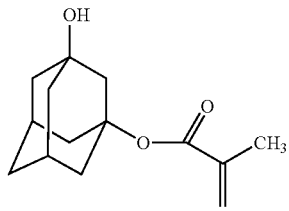

NBLMA=(JSR Corporation, Tokyo, Japan)

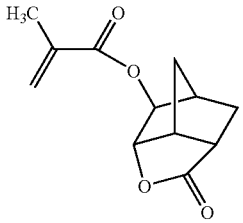

2,3-NBFOHMAc=3-(2,2-bis(trifluoromethyl)-2-hydroxyethyl)-endo-2-(2-methylpropenoyl)-bicyclo[2.2.1]-heptane

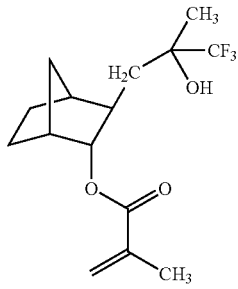

THF=Tetrahydrofuran (Sigma-Aldrich Chemical Co., Milwaukee, Wis.)

Vazo®67=2,2'-azobis(2-methylbutanenitrile) (E. I. du Pont de Nemours and Company, Wilmington, Del.)

Vazo®88=1,1'-Azobis(cyclohexanecarbonitrile) [CAS Registry number 2094-98-6] (E. I. du Pont de Nemours and Company, Wilmington, Del.)

1-Ethylpiperidine hypophosphite ([CAS registry no. 145060-63-5], Sigma-Aldrich Chemical Co., Milwaukee, Wis.

PBA=polybutylacrylate
PMMA=polymethylmethacrylate
PS=polystyrene

Characterization Methods

Size exclusion chromatography with the triple detection method was carried out using an SEC system Model Alliance 2690™ from Waters Corporation (Milford, Mass.), with a Waters 410™ refractive index detector (DRI) and Viscotek Corporation (Houston, Tex.) Model T-60A™ dual detector module incorporating static right angle light scattering and differential capillary viscometer detectors. Data reduction, incorporating data from all three detectors (refractometer, viscometer and light scattering photometer (right angle)), was performed with Trisec® GPC version 3.0 by Viscotek. The Flory-Fox equation was used for angular asymmetry light scattering correction. All chromatographic columns were obtained from Polymer Laboratories (Church Stretton, UK): two PL Gel Mixed C linear columns and one PL Gel 500A column to improve resolution at low molecular weight region of a polymer distribution. The mobile phase was THF, stabilized with 0.05% BHT from J. T Baker, Phillipsburg, N.J.

Preparation of Triethylamine Hypophosphite

A mixture of hypophosphorous acid (6.6 g of a 50% aqueous solution) and toluene (30 mL) was cooled in ice and treated dropwise with triethylamine (5.0 g). Water was removed by azeotropic distillation under vacuum, and then residual toluene was evaporated to provide a nearly colorless, viscous oil, 7.85 g (ca. 95%).

$^1$H NMR (CDCl$_3$): 7.15 (d, a=12.2), 4.4 (bd, a=6.2), 3.00 (q, a=31.1), 1.25 (t, a=49.9). $^{31}$P NMR ($^1$H decoupled): 4.18 (s). $^1$H NMR (CD$_3$CN): 7.62 (s, a=4.91), 6.63 (s, a=4.90), 3.04 (q, a=26.4), 2.78 (bd s, exchangeable H+H$_2$O), 1.29 (t, a=39.6). $^{31}$P NMR ($^1$H decoupled): 3.0 (s). These spectra are in accord with the desired substance.

Preparation of PinMAc

A 3-neck round bottom flask fitted with thermowell, stirbar and reflux condenser was charged with PPN chloride (bis(triphenylphosphine)-iminium chloride, 6.0 g, 10.5 mmol), methacrylic acid (104 g, 1.19 mol) and tetramethyloxirane (250 g, 2.5 mol). The resulting solution was heated at 90° C. for 24 hr. GC analysis showed the ratio of epoxide to 1/1-adduct was 0.37 and the ratio of 1/1 adduct to 2/1 adduct was 67/1. NMR showed essentially complete conversion of methacrylic acid. Excess epoxide was removed under vacuum, and the product was isolated by distillation using a small short-path still head. There was obtained a center fraction (200.1 g) with b.p. 42-47° C./0.05 mm. Total product yield was estimated as 204 g (92.3%). $^1$H NMR (C$_6$D$_6$): 5.96 (m, 1H), 5.13 (m, 1H), 3.00 (bd s, 1H), 1.73 (dd, J=ca. 1.2 Hz, 3H), 1.445 (s, 6H), 1.10 (s, 6H) was consistent with the desired methacrylic ester. (PinMAc)

Preparation of exo-2-(2,2-bis(trifluoromethyl)-2-hydroxyethyl)-endo-3-hydroxy-bicyclo[2.2.1]heptane and exo-2-(2,2-bis(trifluoromethyl)-2-hydroxyethyl)-exo-3-hydroxy-bicyclo[2.2.1]heptane. Sequential Addition Method, Giving Diastereomeric Mixture of Diols A 3-neck flask, fitted with a thermowell, overhead stirrer, septum and N$_2$ inlet, was charged with norcamphor (22.0 g, 200 mmol) and t-butyl methyl ether (50 mL). The solution was cooled to −15° C., treated with hexafluorobutene epoxide (41 g, 228 mmol) by canula, and then a solution of lithium bis(trimethylsilyl)amide (36.8 g, 220 mmol) in 2/1 t-butyl methyl ether/heptane was added dropwise at a rate sufficient to maintain the temperature at −15° C. The mixture was stirred at −15° C. for 15 min, then allowed to warm to 0° C. and stirred for 40 min. The mixture was further warmed to room temperature, then to 28.5° C. as an exotherm took place. The mixture was stirred for an additional 1.75 hr after the reaction returned to room temperature. The lithium salt of the resulting hemiketal was reduced directly by treatment with lithium borohydride as follows.

The above reaction mixture was cooled to ca. 0° C. and treated dropwise with a solution of lithium borohydride (1.45 g, 66.7 mmol) in THF (10 mL). The mixture was stirred for 30 hr at 0° C. and was then allowed to warm slowly to room temperature and was then stirred at ambient temperature for 16 hr. The mixture was cooled to 0° C., treated drop-wise with water (5 mL) and then drop-wise with 100 mL of 2N HCl. The mixture was warmed to room temperature, and the pH was adjusted to ca. 5 by addition of more HCl. The organic layer was separated, dried (using $Na_2SO_4$ and $MgSO_4$), and stripped to give 69 g of crude oil.

Kugelrohr distillation gave 49.1 g of product collected between 80° C. and 105° C. (0.05 mm). $^{19}$F NMR analysis showed an isomeric mixture of diols (isomer ratio=75/25) and ca. 95% purity; $^1$H NMR analysis featured signals at 3.8 (m, a=0.7), 3.28 to 3.2 (m, a=5.3). Distilled material was crystallized from hot hexane (ca. 75 mL) using progressive cooling to −10° C. with occasional agitation to give a first crop, 41.5 g. $^{19}$F NMR ($C_6D_6$): two sets of quartets, −74.83 and −79.10 (J=9.8; a=32.3), and −76.79 and −78.73 (J=9.8; a=100).

$^1$H NMR: 7.02 (s, a=0.24), 5.35 (s, a=0.76), 3.22 (m) and 3.17 (d, J=6.6 Hz, combined a=1.00; ratio of these two signals is 75/25), 2.1 to 0.52 (series of m's, combined a=12.6); signals at 3.22 and 3.17 are assigned to C$\underline{H}$OH; down-field singlets are assigned to the fluoroalcohol OH groups.

Preparation of exo-3-(2,2-bis(trifluoromethyl)-2-hydroxyethyl)-endo-2-(2-methylpropenoyl)-bicyclo[2.2.1]heptane and exo-3-(2,2-bis(trifluoromethyl)-2-hydroxyethyl)-exo-2-(2-methylpropenoyl)-bicyclo[2.2.1]heptane A solution of exo-2-(2,2-bis(trifluoromethyl)-2-hydroxyethyl)-3-hydroxy-bicyclo[2.2.1]heptane (a mixture of isomers, 11.68 g, 40.0 mmol) prepared as described above, in t-butyl methyl ether (40 mL) was cooled to −15° C. and treated drop-wise with a solution of potassium t-butoxide (9.42 g, 80 mmol) in tetrahydrofuran (50 mL) while maintaining the temperature below −10° C. The mixture was stirred for 10 min at −15° C. and then treated dropwise with methacrylic anhydride (6.78 g, 44 mmol) by syringe. The mixture was stirred for 1 hr at −15° C., then warmed to 0° C. for 3 hr. The reaction was quenched by dropwise addition of 20 mL 2 N HCl. The mixture formed two layers, and the pH of the bottom layer was adjusted to ca. 6-7, and the layers were separated. The top (organic) layer was diluted with t-butyl methyl ether, washed twice with sodium bicarbonate to remove methacrylic acid, then with distilled water. The organic layer was dried and methoxyphenol (30 mg) and phenothiazine (50 mg) were added. Solvent was stripped to give 15 g of crude product which was passed through a column of neutral alumina (4"×¾") using 80/20 hexane/t-butyl methyl ether. Evaporation of the first 250 mL eluent provided 11.1 g of colorless liquid. Phenothiazine (50 mg) was added as stabilizer. Kugelrohr distillation provided 9.54 g, bp 73°-78° C./0.03 mm. GC showed two components, 8.18 and 8.26 min, area ratio=30/70, in good agreement with $^{19}$F NMR analysis ($C_6D_6$): 2 isomers, major with equal intensity quartets at −75.26 and −78.80 (70%), minor with quartets at −76.86 and −78.66 (30%). Purity>98%.

$^1$H NMR ($C_6D_6$) showed a spectrum consistent with 2 isomers (30/70), with minor vinyl signals at 5.98 and 5.15 (m), major vinyl signals at 5.93 and 5.08 (m), major OH at 5.25, minor OH at 4.80, minor C$\underline{H}$O at 4.45 (d of unresolved m's, J=7.3), major CHO at 3.85 (pseudo-triplet), other multiplets ca. 2.25 to 0.70.

Example 1 a. Preparation of Copolymer of 2,3-NBFOHMAc/PinMAc

A 3-neck flask fitted with reflux condenser and nitrogen gas inlet with adaptor to vacuum for de-gassing the reaction mixture before initiation, thermowell, and stir-bar was charged with a branched trithiocarbonate RAFT agent, $C_{12}H_{25}SC(S)SC(CH_3)(CN)CH_2CH_2CO_2H$ (FW=403.66; 464 mg,=1.15 mmol), propylene glycol methyl ether acetate (20 mL), 2,3-NBFOHMAc (9.54 g, 26.5 mmol, prepared as described above), PinMAc (1.64 g, 8.82 mmol, prepared as described above) and Vazo®88 (38 mg, 0.15 mmol). The reaction mixture was cooled in ice and several vacuum/nitrogen fill cycles were applied to the system. The temperature was increased to 90° C. over a 0.5 hr time interval. The temperature was maintained at 90° C. for 23 hr.

The reaction solution was cooled to room temperature and added to hexane (350 mL) drop-wise with rapid stirring. The precipitated polymer was filtered and then dried in the vacuum oven (60° C., $N_2$ purge, 18 hr) to provide 9.91 g (89%) of polymer.

$^1$H NMR (THF-d8): 6.9 to 6.1 (bd singlets, with maxima at 6.7 and 6.4; combined a=1.00; ca. 30/70 ratio), 4.7 to 4.15 (bd m, a=1.02), 2.7 to 0.85 (bd m's, integral obscured by solvent peaks; geminal $CH_3$ group signals at 1.55 and 1.25. $^{19}$F NMR (THF-d8): equal intensity bd singlets at −78.40 and −80.21.

Size exclusion chromatography (THF, RI detector, polystyrene standards) showed: Mw=7,690; Mn=6,520; Mw/Mn=1.18.

b. Removal of Trithiocarbonate End-Group from Methacrylate Copolymer

A sample of 2,3-NBFOHMAc/PinMAc copolymer (75/25, 4.00 g, Mn=6,520, 0.61 mmol) prepared in Ex. 1a was charged to a 3 neck flask and dissolved in 2-butanone (20 mL). Triethylamine hypophosphite (0.31 g, 1.83 mmol) and Vazo®67 (46 mg, 0.24 mmol) were added. The reaction mixture was heated to reflux for 2.5 hr. The nearly colorless solution was cooled and the product copolymer was precipitated by addition to heptane (200 mL). The product was filtered, washed with heptane, and dried to provide 4.02 g of polymer.

UV (THF, 1.052 g/liter; 1.0 cm) showed: $A_{305}$=0.027, consistent with essentially complete removal of the trithiocarbonate end groups. SEC (THF; PMMA): Mw=7,990; Mn=6,750; Mw/Mn=1.18. $^1$H NMR (THF-d8) showed some residual triethylamine hypophosphite contaminant. The product was dissolved in ethyl acetate, washed with dilute hydrochloric acid containing additional sodium chloride, followed by dilute sodium bicarbonate containing added sodium chloride. Ethyl acetate was removed under vacuum and the product was dissolved in methanol and precipitated in water to give copolymer free of reagent and RAFT-derived contaminants.

Example 2 a. Preparation of Tetrabutylammonium Hypophosphite

A mixture of 50% aqueous hypophosphorous acid (6.6 g, 50 mmol) and toluene (30 mL) was cooled in ice and treated with tetrabutyl-ammonium hydroxide solution (32.4 g of 40% solution in water). The pH was adjusted to 7.00 by the addition of sodium bicarbonate. Toluene and the remaining water were removed under reduced pressure. The residue was dissolved in methyl ethyl ketone, filtered, and evaporated. The residue was triturated with diethyl ether and dried to afford a hygroscopic crystalline solid, 15.5 g.

$^1$H NMR (CD$_3$CN): 7.15 (d, a=4.79), 3.13 (m, a=18.6), 1.63 (m, a=19.0), 1.38 (m, a=19.0), 1.00 (t, a=28.9).

$^{31}$P NMR, $^1$H decoupled (CD$_3$CN): 4.0 (s)

b. Synthesis of Tetrapolymer of MAMA/β-GBLMA/HAdMA/NBFOHMAc

A 3-neck flask fitted with addition funnel and nitrogen gas inlet, thermowell, and stir-bar was charged with RAFT agent C$_{12}$H$_{25}$SC(S)SC(CH$_3$)(CN)CH$_2$CH$_2$CO$_2$CH$_3$ (2.34 g, 5.60 mmol), methyl ethyl ketone (80 mL), and monomer pre-charge, consisting of MAMA=39.44 g, β-GBLMA=3.12 g, HAdMA=2.89 g, NBFOHMAc=2.87 g, and Vazo® 88 (414 mg, 1.70 mmol). A solution of monomers, consisting of β-GBLMA=12.50 g, HAdMA=11.58 g, and NBFOHMAc=11.50 g in MEK (120 mL) was charged to the addition funnel. The reactor was filled with nitrogen, and two evacuation/fill cycles were performed. The temperature was increased to 84° C. over a 1.0 hr time interval. The monomer feed was continued over a 5 hr time period. The reaction gradually decreased from 84° C. to 81° C. over 20.5 hr.

The solution was cooled and added to methanol (2400 mL) dropwise with rapid stirring. The supernatant was decanted and the remaining polymer was treated with methanol and stirred to suspend finer particles. After settling, the supernatant was again decanted. This purification process was repeated, except the product was collected by filtration and dried to give 61.5 g of polymer.

SEC (THF, RI detector, PMMA standards) showed: Mw=11,000; Mn=9,370; Mw/Mn=1.17.

$^{13}$C NMR and $^1$H NMR were consistent with polymer composition MAMA/β-GBLMA/HAdMA/NBFOHMAc as 44.9/25.4/16.9/12.8.

c. Reduction of Trithiocarbonate End Group from Methacrylate Copolymer using Tetrabutylammonium Hypophosphite A sample of MAMA/β-GBLMA/HAdMA/NBFOHMAc (44.9/25.4/16.9/12.8; 6.00 g, 0.64 mmol) copolymer was charged to a 3 neck flask, dissolved in 2-butanone (30 mL), and combined with tetrabutylammonium hypophosphite (0.61 g, 2.0 mmol) and Vazo® 67 (48 mg, 0.25 mmol). The reaction mixture was heated to reflux for 5 hr and then cooled. The cooled solution was added to heptane (200 mL) to precipitate polymer. A solid was obtained (6.27 g) that was substantially reduced in color compared to the starting material. The UV spectrum (THF, 0.995 g/liter; 1.0 cm) showed: A$_{311}$=0.04. For comparison, UV spectrum (THF; 0.997 g/liter; 1.0 cm) of starting copolymer exhibited: A$_{311.5}$=0.867. This indicates that the trithiocarbonate group was essentially completely removed (>95% removal). $^1$H and $^{13}$C NMR showed that a fraction of β-GBLMA monomer units had been cleaved to methacrylic acid units in the polymer.

Example 3

Removal of Trithiocarbonate End-Group from Poly(acetoxystyrene) Homopolymer

A sample of poly(acetoxystyrene) (Mw=19,000; Mn=18,500; 4.00 g, 0.22 mmol), prepared with RAFT agent=C$_{12}$H$_{25}$SC(S)SCH$_2$CN, was charged to a 3 neck flask and dissolved in methyl ethyl ketone (15 mL). Triethylamine hypophosphite (0.20 g, 1.2 mmol) and Vazo®67 (30 mg, 0.1 mmol) were added, and the reaction mixture was heated to 80° C. for 3 hr.

The reaction mixture was cooled, and then volatiles were removed under vacuum to provide a solid that was washed consecutively with hexane and methanol. Drying under vacuum provided 3.65 g of solid.

UV (THF) showed that the trithiocarbonate functional group was essentially completely removed.

SEC (THF; triple detection method, same as used for starting material): Mw=19,100; Mn=18,100; Mw/Mn=1.06.

Example 4 a. Preparation of NCCH$_2$—PBA-SC(=S)SC$_{12}$H$_{25}$

A solution containing n-butyl acrylate (6.0 mL), the RAFT agent C$_{12}$H$_{25}$SC(S)SCH$_2$CN (400 mg), VAZO®64 (2.2 mg) and benzene (4.0 mL) was degassed and heated at 60° C. for 5 hr. Removal of the volatiles under reduced pressure provided a yellow polymer (3.4 g, 63% conversion) of Mn=3080 and Mw/Mn=1.09. The proton NMR of the polymer showed the presence of protons on carbon next to sulphur at 4.8 ppm [—CH(COOBu)SC(S)S—] and 3.3 ppm [—SC(S)SCH$_2$C$_{11}$H$_{23}$].

b. Removal of End-Group from NCCH$_2$—PBA-SC(=S)SC$_{12}$H$_{25}$

A mixture of NCCH$_2$—PBA-SC(=S)SC$_{12}$H$_{25}$ (154 mg, prepared in Ex. 4a), N-ethylpiperidine hypophosphite (45 mg, Sigma-Aldrich Co., Milwaukee, Wis.) and Vazo®88 (4 mg) in toluene (1 mL) was degassed and heated at 100° C. for 2 hrs. The solution was extracted with water and the toluene removed to give a colorless polymer. GPC analysis showed the polymer to have Mn=2850 and Mw/Mn=1.09.

The proton NMR of the product demonstrated the absence of the signals for protons on carbon next to sulphur, which were present in the starting material at 4.8 ppm and 3.3 ppm.

Example 5 a. Preparation of CH$_3$)$_2$C(CN)—PMMA-SC(=S)SC$_{12}$H$_{25}$

A solution of the RAFT agent C$_{12}$H$_{25}$SC(S)SC(CN)(CH$_3$)$_2$ (685 mg) and VAZO®88 (10.5 mg) in methyl methacrylate (7.0 mL) and benzene (3.0 mL) was degassed and then heated at 90° C. for 6 hr. Removal of the volatiles under reduced pressure afforded a yellow polymer (5.3 g, 81% conversion) of Mn=3400 and Mw/Mn=1.18. The end-group protons on carbon next to sulphur [—SC(S)SCH$_2$C$_{11}$H$_{23}$] appeared at 3.2 ppm in the proton NMR.

b. Removal of the End-Group from $(CH_3)_2C(CN)$—PMMA-SC(=S)SC$_{12}H_{25}$

A mixture of $(CH_3)_2C(CN)$—PMMA-SC(=S)SC$_{12}H_{25}$ (170 mg, prepared in Ex. 5a), N-ethylpiperidine hypophosphite (45 mg) and Vazo®88 (4 mg) in toluene (1 mL) was degassed and then heated at 100° C. for 2 hrs. The solution was extracted with water and the toluene removed to give a colorless polymer of Mn=3380 and Mw/Mn=1.16 by GPC analysis.

The NMR of the product showed that the dodecyl end group was no longer present.

Example 6 a. Preparation of $(CH_3)_2C(Ph)$-PS—SC(=S)Ph

A solution of RAFT agent $(CH_3)_2C(Ph)SC(S)Ph$ (995 mg), VAZO®88 (16 mg) in styrene (16.0 mL) and benzene (4.0 mL) was degassed and then heated at 90° C. for 16 hr.

Removal of the volatiles under reduced pressure afforded a red polymer (2.2 g, 15% conversion) of Mn=333 and Mw/Mn=1.14. The end-group protons on carbon next to sulphur [—CH(Ph)SC(S)Ph] appeared in the proton NMR as a complex signal between 4.5 and 5.0 ppm. The aromatic protons ortho to the C=S group produced a signal at 7.9 ppm.

b. Removal of the End-Group from $(CH_3)_2C(Ph)$-PS—SC(=S)Ph

A mixture of $(CH_3)_2C(Ph)$-PS—SC(=S)Ph (170 mg, prepared as in Ex. 6a), N-ethylpiperidine hypophosphite (450 mg) and Vazo®88 (10 mg) in toluene (2 mL) was degassed and then heated at 110° C. for 4 hrs. The solution was diluted with ethyl acetate (5 mL), extracted with water and then the organic phase evaporated to give a near-colorless polymer of Mn=310 and Mw/Mn=1.19 by GPC analysis. The NMR of the product revealed the absence of the end-group proton on carbon next to sulphur, which in the starting material appeared as a complex signal between 4.5 and 5.0 ppm. Also absent were the end-group aromatic protons ortho to the C=S group which produced a signal in the starting material at 7.9 ppm, indicating that the end-group has been substantially removed (>95%).

Example 7 a. Preparation of Polystyrene of Mn=4475

A solution of RAFT agent $C_{12}H_{25}SC(S)SCH_2CN$ (584 mg), VAZO®88 (16 mg) in styrene (16.0 mL) and benzene (4.0 mL) was degassed and then heated at 90° C. for 16 hr. Removal of the volatiles under reduced pressure afforded a yellow polymer (8.4 g, 58% conversion) of Mn=4475 and Mw/Mn=1.06. The proton NMR showed the end-group proton [—CH(Ph)SC(S)S—] as a broad signal between 4.6 and 5.1 ppm and the methylene of the dodecyl group [—SC(S)SCH$_2$C$_{11}$H$_{23}$] at 3.25 ppm.

b. Removal of End-Group from Polystyrene of Mn=4475

A solution of NCCH$_2$—PS—SC(S)SC$_{12}$H$_{25}$ of Mn=4475 and Mw/Mn=1.06 (224 mg, prepared in Ex. 7a), N-ethylpiperidine hypophosphite (90 mg), VAZO®88 (5 mg) in toluene (1 mL) was degassed and then heated at 110° C. for 4 hr. The mixture was diluted with ethyl acetate (10 mL), extracted with water and then the organic phase evaporated. This produced a colorless polymer of Mn=3970 and Mw/Mn=1.10 by GPC analysis. The proton NMR revealed the absence of both of the end-group protons that appear in the starting material at 4.6-5.1 and 3.25 ppm.

Example 8

Preparation of 2,3-NBFOHMAc/MGM/HAdMA Copolymer

A 3-neck flask fitted with a thermocouple, reflux condenser, stir-bar, and nitrogen gas inlet with adapter to vacuum for de-gassing the reaction was charged with the trithiocarbonate RAFT agent, $C_{12}H_{25}SC(S)SC(CH_3)(CN)CH_2CH_2CO_2CH_3$ (1.472 g, 3.52 mmol), a monomer charge consisting of 2,3-NBFOHMAc (10.80 g, 30 mmol), 2-methyl-2-adamantyl glycolylmethacrylate (MGM) (12.28 g, 42.0 mmol), and 3-hydroxy-1-adamantylmethacrylate (HAdMA) (7.09 g, 30 mmol), methyl ethyl ketone (32 mL), sodium bicarbonate powder (0.170 g), and V601 initiator (230 mg, 1.0 mmol). The reactor was filled with nitrogen, and two more evacuation/fill cycles were performed. The temperature was increased to 67° C. over 0.5 h. The reaction was maintained at 67° C. for 20 h. $^1$H NMR of an aliquot showed that total residual monomer content was very low, ca. 0.6 mol %.

The cooled mixture was diluted with methyl ethyl ketone, filtered, and added slowly to heptane (1000 mL) to provide a uniform solid that was filtered and air-dried. There was obtained 30.3 g of solid. $^1$H NMR (THF-d8) showed no detectable monomers, and no carboxylic acid formation.

TGA showed onset of significant weight loss at ca. 175° C. MDSC exhibited Tg of 147° C. SEC analyses showed Mw=8340; Mn=7010; PD=1.19. UV (THF; 1.000 g/liter) showed $A_{310}$=1.155. $^{13}$C NMR analysis showed: 2,3-NBFOHMAc=27.9%; MGM=41.2%; HAdMA=30.9%.

Example 9

Reduction of Trithiocarbonate End Group from Methacrylate copolymer with Et$_3$NH H$_2$PO$_2$ A sample of 2,3-NBFOHMAc/MGM/HAdMA copolymer (20.0 g, 2.85 mmol), prepared as in Example 8, was charged to a 3-neck flask and dissolved in 2-butanone (70 mL). Triethylammonium hypophosphite (3.0 g, 18 mmol) and Vazo® 67 (288 mg, 1.5 mmol) were added, and the reaction mixture was heated to 68° C.-70° C. The yellow color intensity decreased substantially during the reaction period. Another charge of Vazo® 67 (90 mg) was added after 3 h, and heating was then continued for 1.5 h.

The cooled polymer solution was diluted with 10 mL MEK, filtered, then added slowly dropwise to a cold solution of 70/30 water/methanol (700 mL; −5° C., electronic grade). The mixture was filtered, and the solid was washed with additional water/methanol (4×100 mL) to provide white solid after air-drying. The polymer sample was re-precipitated twice using MEK and 70/30 water/methanol as above to completely remove NMR-detectable triethylammonium hypophosphite salt. There was obtained 19.0 g of polymer.

UV (THF; 1.000 g/liter; 1.0 cm) showed $A_{310}$<0.01, showing high conversion of the trithiocarbonate functionality. SEC showed Mw=8100; Mn=6800; PD=1.19. Composition by $^{13}$C NMR: 2,3-NBFOHMAc=28.8%; MGM=40.5%; HAdMA=30.7%. MDSC showed Tg at 140.7° C. TGA showed onset of thermal weight loss at 150° C.

Example 10

Preparation of Diazabicyclo[2.2.2]Octane Hypophosphite

A solution of 50% aqueous hypophosphorous acid (46.2 g, 0.35 mol) at 0°-7° C. was treated slowly with a solution of 1,4-diazabicyclo[2.2.2]octane (39.3 g, 0.35 mol) in water (80 mL). The pH of the resulting solution was estimated as 7.0. Water was removed under reduced pressure to give a solid residue that was triturated with methyl ethyl ketone to afford 57.9 g of white crystalline solid.

$^1$H NMR (CD$_3$OD): 7.2 (d, a=2.0), 3.25 (s, a=12.0); $^{31}$P 3.2 (t, J$_{PH}$=507 Hz).

What is claimed is:

1. A process for replacing a functional group, —SC(S)X, with —H, comprising contacting a polymer containing a functional group, —SC(S)X with a salt of hypophosphorous acid and a radical initiator, wherein
   X is R, OR$^1$, N(R$^2$)$_2$, SR$^3$, or P(O)(OR$^4$)$_2$;
   R is substituted or unsubstituted C$_1$-C$_{25}$ alkyl; substituted or unsubstituted C$_2$-C$_{25}$ alkenyl; substituted or unsubstituted C$_2$-C$_{25}$ alkynyl; substituted or unsubstituted phenyl; substituted or unsubstituted naphthyl; and substituted or unsubstituted benzyl; and
   R$^1$, R$^2$, R$^3$, and R$^4$ are substituted or unsubstituted C$_1$-C$_{25}$ alkyl; substituted or unsubstituted C$_6$-C$_{10}$ aryl; a 3- to 8-membered carbocyclic or heterocyclic ring, or N(R$^2$)$_2$ is a 3- to 8-membered heterocyclic ring.

2. The process of claim 1, wherein the salt of hypophosphorous acid is a mono-, di-, tri-, or tetra-alkylammonium salt of hypophosphorous acid.

3. The process of claim 1, wherein the salt of hypophosphorous acid is a triethylammonium, tetrabutylammonium, Dabco, or N-ethylpiperidinium salt of hypophosphorous acid.

4. The process of claim 1, wherein the salt of hypophosphorous acid is formed in situ through the reaction of a nitrogen base with hypophosphorous acid.

5. The process of claim 1, wherein X is R, and R is selected from the group of substituted or unsubstituted C$_1$-C$_{25}$ alkyl; substituted or unsubstituted C$_2$-C$_{25}$ alkenyl; substituted or unsubstituted C$_2$-C$_{25}$ alkynyl; substituted or unsubstituted phenyl; substituted or unsubstituted naphthyl; and substituted or unsubstituted benzyl.

6. The process of claim 1, wherein X is OR$^1$, and R$^1$ is selected from the group of substituted or unsubstituted C$_1$-C$_{25}$ alkyl; substituted or unsubstituted phenyl; pentafluorophenyl; and substituted or unsubstituted naphthyl.

7. The process of claim 1, wherein X is N(R$^2$)$_2$, and N(R$^2$)$_2$ is selected from the group of substituted or unsubstituted dimethylamine, diethylamine, dipropylamine, dibutylamine, pyrrolidyl, imidazolinyl, pyrrolidonyl, and phthalimidyl.

8. The process of claim 1, wherein X is SR$^3$, and R$^3$ is selected from the group of substituted or unsubstituted C$_1$-C$_{25}$ alkyl; substituted or unsubstituted benzyl; and substituted or unsubstituted phenyl.

9. The process of claim 1, wherein the polymer comprises repeat units derived from a group consisting of acrylates, methacrylates, and styrenes.

10. The process of claim 1, wherein the polymer is produced by a RAFT polymerization process.

* * * * *